United States Patent [19]

Miller

[11] 4,084,252

[45] Apr. 11, 1978

[54] CURRENT MODE 5-BIT ARITHMETIC LOGIC UNIT WITH PARITY

[75] Inventor: Homer Warner Miller, Peoria, Ariz.

[73] Assignee: Honeywell Information Systems Inc., Phoenix, Ariz.

[21] Appl. No.: 756,456

[22] Filed: Jan. 3, 1977

[51] Int. Cl.² ............................................. G06F 11/10
[52] U.S. Cl. ................................................... 364/738
[58] Field of Search .................. 235/153 BB; 364/738

[56] References Cited

U.S. PATENT DOCUMENTS

| 3,649,817 | 3/1972 | Keller et al. | 364/738 |
| 3,758,760 | 9/1973 | Cowan | 364/738 |
| 3,925,647 | 12/1975 | Louie | 364/738 |
| 3,986,015 | 10/1976 | Gooding et al. | 364/738 |

OTHER PUBLICATIONS

Hsiao and Wolff, High-Speed, Self-Checked, BCD Adder, IBM Technical Disclosure Bulletin, vol. 4, No. 12, May 1962, pp. 59-61.

Primary Examiner—Charles E. Atkinson
Attorney, Agent, or Firm—William W. Holloway, Jr.; Ronald T. Reiling; Nicholas Prasinos

[57] ABSTRACT

An arithmetic logic unit employing soft-saturating current mode logic gates receives as inputs two 5-bit bytes and generates a 5-bit binary output byte in accordance with the particular operational mode prescribed by a mode control signal. The unit performs sixteen binary arithmetic or sixteen Boolean logic operations on two 5-bit input fields Ai and Bi. A carry-in input CIN, a carry generate output G, and a carry propogate output P are provided so that the device can be utilized in a full carry look-ahead configuration with a separate carry look-ahead array. A special output F= is provided for zero detection purposes. In addition to the arithmetic or logic operations, the unit generates a parity of the half-sums signal HS, a parity of the half-parities signal HP, a parity of the carries signal PC, and a carry error signal CE. A carry-out signal COUT is also generated.

2 Claims, 27 Drawing Figures

CURRENT MODE 5-BIT ARITHMETIC LOGIC UNIT WITH PARITY

CROSS-REFERENCE TO RELATED INVENTIONS

1. Current Mode Carry Look Ahead Array invented by Homer W. Miller, now issued as U.S. Pat. No. 3,925,652 and assigned to the same assignee as the instant invention.
2. Magnitude Comparison Circuit invented by Homer W. Miller, now issued as U.S. Pat. No. 3,955,177 and assigned to the same assignee as the instant invention.
3. Current Mode Arithmetic Logic Array invented by Homer W. Miller, now issued as U.S. Pat. No. 3,925,651 and assigned to the same assignee as the instant invention.
4. Current Mode Binary (BCD) Arithmetic Array invented by Homer W. Miller, now issued as U.S. Pat. No. 3,958,112 and assigned to the same assignee as the instant invention.
5. Data Alignment Circuit invented by Darrel L. Fett, now issued as U.S. Pat. No. 3,967,101 and assigned to the same assignee as the instant invention.
6. Selector Latch Gate invented by Darrell L. Fett, now issued as U.S. Pat. No. 3,953,746 and assigned to the same assignee as the instant invention.
7. N-Bit Register System Using CML Circuits invented by Darrell L. Fett, now issued as U.S. Pat. No. 3,984,702 and assigned to the same assignee as the instant invention.
8. High-Speed Random Access Memory invented by Darrell L. Fett, now issued as U.S. Pat. No. 3,916,394 and assigned to the same assignee as the instant invention.
9. Multiple-Generating Register invented by Darrell L. Fett, now issued as U.S. Pat. No. 3,949,209 and assigned to the same assignee as the instant invention.
10. Multiple-Generating Register invented by Jerome L. Kindell, bearing Ser. No. 642,845, filed Dec. 22, 1975, now U.S. Pat. No. 4,034,198, and assigned to the same assignee as the instant invention.
11. Current Mode Arithmetic Logic Circuit With Parity Prediction and Checking invented by Homer W. Miller bearing Ser. No. 756,457, filed Jan. 3, 1977, and assigned to the same assignee as the instant invention.
12. Current Mode Multiple-Generating Register invented by Homer W. Miller bearing Ser. No. 765,465, filed Jan. 3, 1977, and assigned to the same assignee as the instant invention.
13. Current Mode Simultaneous Dual-Read/Single-Write Memory Device invented by Darrell L. Fett bearing Ser. No. 756,466, filed Jan. 3, 1977, and assigned to the same assignee as the instant invention.
14. Current Mode 4-Bit Arithmetic Logic Unit With Parity invented by Homer W. Miller bearing Ser. No. 756,458, filed Jan. 3, 1977, and assigned to the same assignee as the instant invention.
15. Current Mode Binary/Decimal Arithmetic Logic Unit With Parity invented by Homer W. Miller bearing Ser. No. 756,460, filed Jan. 3, 1977, and assigned to the same assignee as the instant invention.
16. 5-Bit 1-of-4 Gated Select Circuit Utilizing Current Mode Logic invented by Homer W. Miller bearing Ser. No. 756,464, filed Jan. 3, 1977, and assigned to the same assignee as the instant invention.
17. 17-Bit Equality Comparator Utilizing Current Mode Logic invented by Homer W. Miller bearing Ser. No. 756,459, filed Jan. 3, 1977, and assigned to the same assignee as the instant invention.
18. J-K Flip-Flop Utilizing Current Mode Logic With Non-Functional Test Capability invented by Homer W. Miller bearing Ser. No. 756,461, filed Jan. 3, 1977, and assigned to the same assignee as the instant invention.
19. 4-Bit Counter/Shift Register Utilizing Current Mode Logic invented by Homer W. Miller bearing Ser. No. 756,463, filed Jan. 3, 1977, and assigned to the same assignee as the instant invention.
20. 10-Bit D-Type Register Utilizing Current Mode Logic invented by Homer W. Miller bearing Ser. No. 756,462, filed Jan. 3, 1977, and assigned to the same assignee as the instant invention.

BACKGROUND OF THE INVENTION

This invention relates generally to digital logic circuitry and, more particularly, to an improved current mode 5-bit arithmetic logic unit with parity.

Various arithmetic logic units are known in the prior art. The current mode arithmetic logic array disclosed in the above-identified U.S. Pat. No. 3,925,651 is directed to an arithmetic logic array which performs the basic arithmetic and logic functions of the present invention. The improved current mode 5-bit arithmetic logic unit with parity of the present invention provides, in addition to the basic arithmetic and logic functions, necessary and useful parity and error output signals on a 5-bit binary field. It may be used in conjunction with the above-identified Ser. No. 756,458 to perform parity prediction, parity checking, and carry error detection operations. Consequently, errors generated within the arithmetic logic unit or errors which are generated during the transmission of such binary data to the arithmetic logic unit are detected quite early in the processing operation, resulting in an overall savings of processing time.

OBJECTS OF THE INVENTION

It is therefore an object of the present invention to provide an improved current mode 5-bit arithmetic logic unit with parity.

It is also an object of the present invention to provide an improved current mode 5-bit arithmetic logic unit with parity which generates a half-sums output signal HS.

It is another object of the present invention to provide an improved current mode 5-bit arithmetic logic unit with parity which generates a half-parities output signal HP.

It is yet another object of the present invention to provide an improved current mode 5-bit arithmetic logic unit with parity which generates a carry-error output signal CE.

It is a further object of the present invention to provide an improved current mode 5-bit arithmetic logic unit with parity which generates a parity of the carries output signal PC.

These and other objects of the invention are achieved in accordance with a preferred embodiment of the invention by providing an improved current mode 5-bit arithmetic logic unit with parity comprising a logic portion including a half-adder and circuitry performing other logic functions on two 5-bit sets of data inputs Ai and Bi, a carry look-ahead circuit portion, and a half-sum and carry portion. In addition to the two 5-bit sets of inputs, a 5-bit mode control signal is received as an input for determining the particular arithmetic or logic function to be performed on the input data. A carry input signal CIN and a carry-in duplicate signal CIND are also provided. Parity of the half-sums signal HS, parity of the half-parities signal HP, parity of the carry signal PC, and carry error signal CE are generated as ouputs. The unit also generates a 5-bit binary resultant output Fi and a carry-out signal COUT Importantly, each portion of the arithmetic logic unit is implemented using soft-saturating current mode logic gates as basic circuit elements.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIGS. 3A and 3B show a combination block/circuit diagram illustrating another portion of a preferred embodiment of the current mode 5-bit arithmetic logic unit with parity of the present invention.

FIGS. 5a-14a show various logic symbols appearing in FIGS. 2A-2C, 3A, 3B, and 4.

FIGS. 5b-14b show detailed circuit schematics for performing the logic functions represented by the logic symbols in FIGS. 5a-14a.

DETAILED DESCRIPTION OF THE INVENTION

Figure 1:
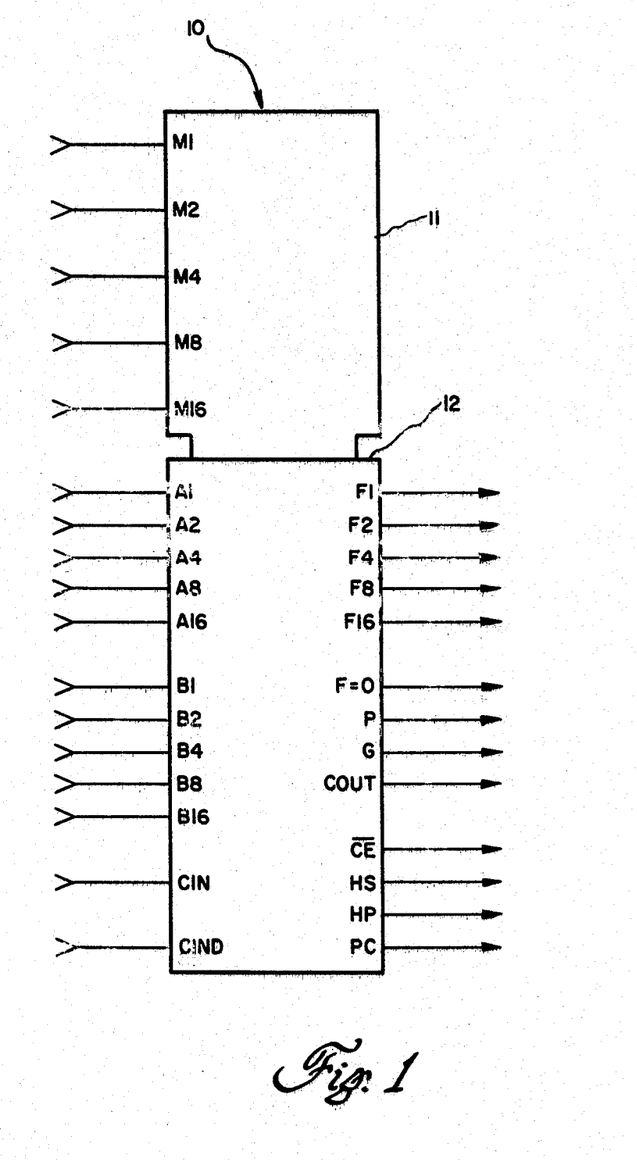
FIG. 1 shows a symbolic representation of the current mode 5-bit arithmetic logic unit with parity, including the inputs thereto and outputs therefrom, of the present invention.

FIG. 1 is a symbolic representation of the current mode 5-bit arithmetic logic unit with parity, including the inputs thereto and outputs therefrom, of the present invention. The 5-bit arithmetic logic unit 10 comprises a control portion 11 and an input/output portion 12. Control portion 11 receives a 5-bit mode control signal M1-M16 for prescribing the particular arithmetic or logic operation to be performed.

The input/output portion 12 receives as inputs two 5-bit parity input fields A1-A16 and B1-B16. In addition, portion 12 receives a carry-in input signal CIN and a carry-in duplicate signal CIND. The input/output portion 12 generates a 5-bit binary output resultant signal F1-F16 in accordance with the particular arithmetic or logic operation prescribed by the mode control signal M1-M16. In addition, portion 12 provides a zero-valued output signal F=0. Furthermore, portion 12 produces a propogate signal P, a generate signal G, and a carry-out signal COUT which are utilized when the device is used in combination with other arrays and in particular where the look ahead-carry array disclosed in the above-identified U.S. Pat. No. 3,925,652 is used. Additionally, a carry error $\overline{CE}$ signal, a parity of the half-sum signal HS, a parity of the half-parities signal HP, and a parity of the carries signal PC are generated by the input/output portion 12.

As stated above, the current mode 5-bit arithmetic logic unit with parity employs soft-saturating current mode logic gates including several basic circuit components, which individual circuit components are illustrated in FIGS. 5-14. In these figures, the logic symbol is illustrated together with the detailed schematic of the equivalent electrical circuit. The overall logic architecture includes a lower level gate and an upper level gate which in combination have an output voltage swing of only approximately 0.5V. This limited voltage swing reduces the power requirements and reduces the transition times.

Figure 5A:
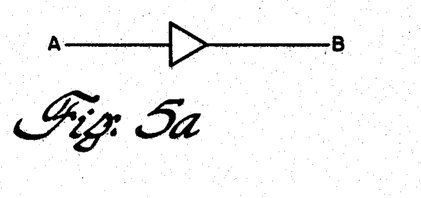
Figure 5B:
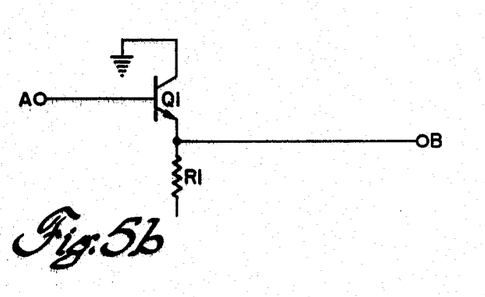

FIG. 5a is the symbol for an emitter follower having an input A and an output B. This is used in the present invention primarily as a voltage translator, shifting the voltage applied at input A down by 0.8V at the output B. FIG. 5b shows the equivalent electrical circuit, wherein input A is applied to be base of transistor Q1, and output B is taken at the common terminal of resistor R1 and the emitter of transistor Q1.

Figure 6A:
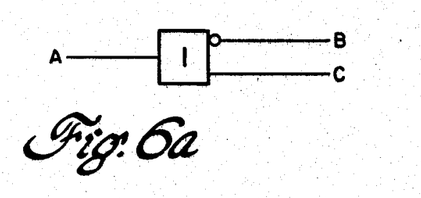
Figure 6B:
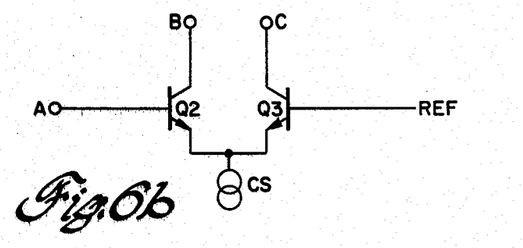
Figure 7A:
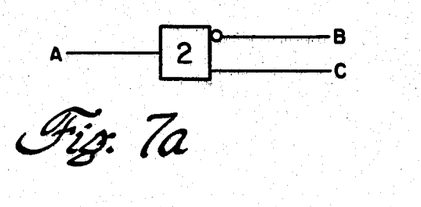
Figure 7B:
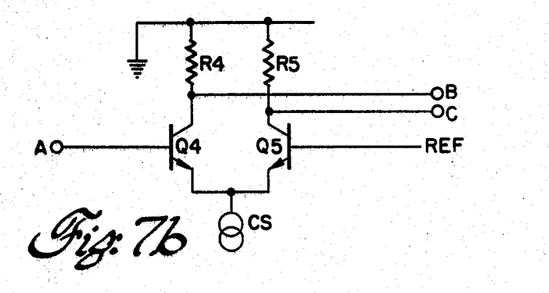

FIGS. 6a-8a illustrate the symbol for a lower level gate, which gate may be implemented in any of the three ways illustrated in FIGS. 6b-8b, depending upon whether the outputs of the lower level gate drive an upper level gate or not. The lower level gate has an input A, a true output C and a complement output B. In FIG. 6b the A input is applied to the base of transistor Q2, and a reference voltage of 1.06V is applied to the base of transistor Q3. The true or C output is taken from the collector terminal of transistor Q3, and the complement or B output is taken from the collector of transistor Q2. With NPN bipolar transistors a binary 0 at input A in the form of a 0.8V signal causes conduction in transistor Q2 and non-conduction in transistor Q3, so that a binary 0, representing the absence of current, is generated over the C output, and a binary 1, representing the presence of current, appears at the B output. Conversely, a binary 1 at input A renders transistor Q2 non-conductive and transistor Q3 conductive, thereby generating a binary 0 at output B and a binary 1 at output C. When either or both of the outputs B and C of the lower level gate are used to drive an upper level gate, such as that illustrated in FIGS. 10, 11, or 13, the resistor is eliminated from the corresponding leg of the output portion of the lower level gate. Thus, the circuit illustrated in FIG. 6b, whose outputs are both used to drive upper level gates, has no resistors in the output legs. Since neither of the outputs of the circuit shown in FIG. 7b is used to drive an upper level gate, resistors R4 and R5 appear in both output legs of the circuit. Regarding the circuit shown in FIG. 8b, the B output drives an upper level gate, whereas the C output does not drive an upper level gate.

Figure 9A:
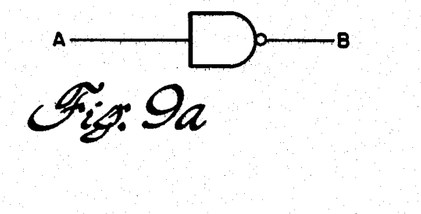
Figure 9B:
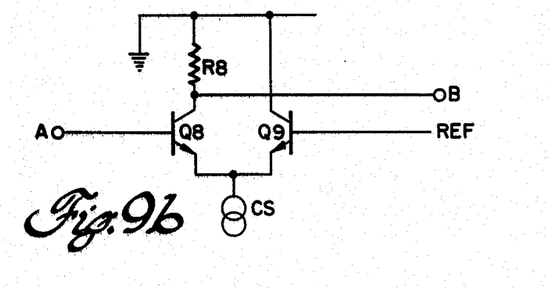

FIG. 9a shows the logic symbol for an inverter having an input A and an inverting output B. Referring to FIG. 9b, when a binary 1 in the form of a 0.5V signal (assuming a negative logic convention) appears on input A at the base of transistor Q8, Q8 is turned off, and a 0V signal representing a binary 0 appears at the output B. Conversely, when input A is a binary 0, Q8 turns on, and the voltage at output B is −0.5V representing a binary 1.

Figure 10A:
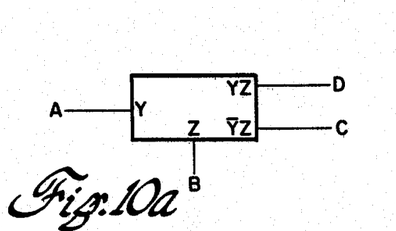
Figure 10B:
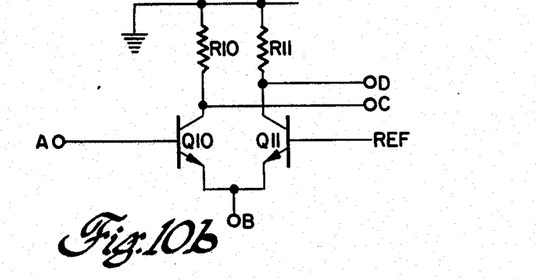

FIG. 10a shows the symbol for a 2-input upper level gate having inputs A and B applied to input terminals Y and Z, respectively, and producing Y.Z and $\overline{Y.Z}$ outputs at output terminals D and C, respectively. In the equivalent electrical schematic of FIG. 10b input A is applied to the base of transistor Q10, and input B is applied to the common terminal of the emitters of transistors Q10 and Q11. A reference voltage of −0.26 V is applied to the base of the transistor Q11, and the collectors of transistors Q10 and Q11 are connected through resistors R10 and R11, respectively, to ground. The C output is taken at the collector of transistor Q10, and the D output is taken at the collector of transistor Q11.

Figure 11A:
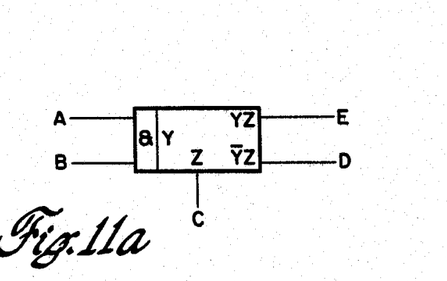
Figure 11B:
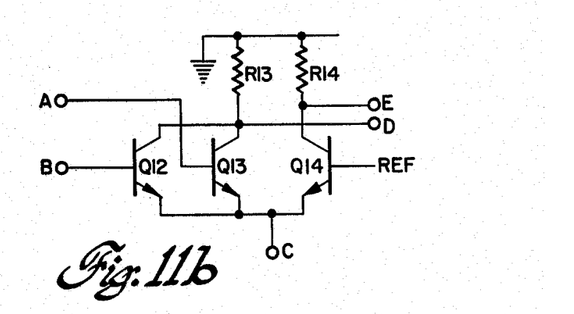

The upper level gate shown in FIG. 11a is similar in function to that shown in FIG. 10a, the Y input here being the AND function of inputs A and B and the Z input again being the C input. Thus, output E equals A.B.C and output D equals $\overline{A.B.C}$. With reference to the equivalent electrical schematic shown in FIG. 11b, the A and B inputs are applied to the bases of transistors Q13 and Q12, respectively, the C inputs is applied to the common terminal of the emitters of transistors Q12-Q14, the D output is taken at the common terminal of the collectors of transistors Q12 and Q13, and the E output is taken at the collector of transistor Q14. For current to flow through the E output, inputs A and B must both be a binary 1 in the form of a −0.5V signal, thus rendering transistor Q14 conductive and input C must be present. Otherwise, if either of the A or B inputs are a binary 0 (0V) and the C input is present, current will flow through output terminal D.

The upper level gate of FIGS. 10 and 11 are used in combination with the lower level gates shown in FIGS. 6-8. As described previously, the reference voltage for the upper level gates is −0.26V and the logic inputs are either 0V or −0.5V. The output voltage swings between 0 and −0.5V. Since the inputs to the lower level gates are derived from emitter followers, the consequent 0.8V voltage translation necessitates a reference voltage of −1.06V for the lower level gates.

Figure 12A:
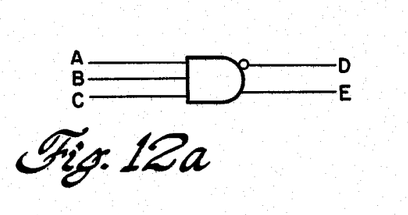
Figure 12B:
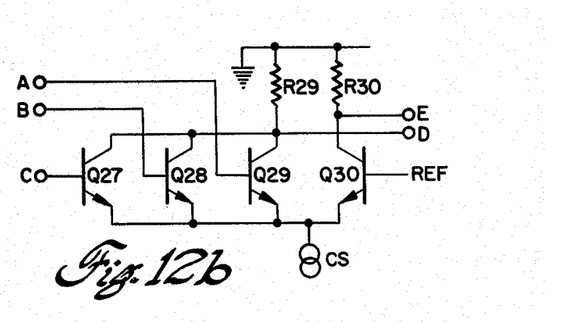

FIG. 12a shows the logic symbol for a three-input NAND gate having a true output E and a complementary output D. The true output E of the NAND gate is a logical 1 whenever any of the inputs is a logical 0, and the true output E becomes a logical 0 only when all three inputs are logical 1's. The equivalent electrical circuit is shown in FIG. 12b wherein the emitter outputs of tansistors Q27-Q30 are all tied to current source CS, the collector junctions of transistors Q27-Q29 are connected to ground through resistors R29, and the collector junction of transistor Q30 is connected to ground through resistor R30. The C, B and A inputs are connected to the bases of transistors Q27, Q28 and Q29, respectively. The D output is tied to the common junction of the collector of transistor Q29 and resistor R29. The E output is connected to the common junction of the collector of transistor Q30 and resistor R30.

Figure 13A:
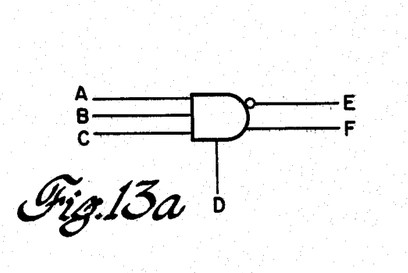
Figure 13B:
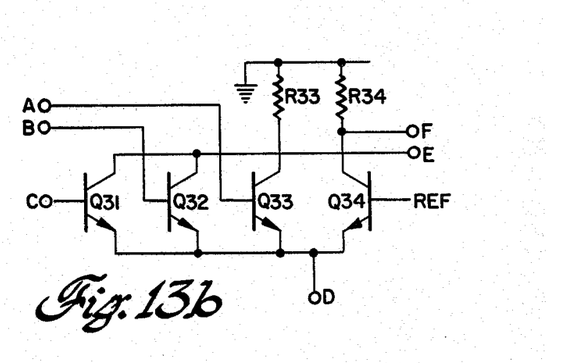

FIG. 13a illustrates the logic symbol for upper level gate having inputs A and B of opposite polarity and an enabling input C. Output D is of the same polarity as input A, and output E has the polarity of input B. Referring to the equivalent schematic of FIG. 13b, input A supplied to the base of transistor Q17, input B is applied to the base of transistor Q18, input C is applied to the common terminal of the emitters of transistors Q17 and Q18, output D is taken from the junction of resistor R18 and the collector of transistor Q18, and output E is taken from the junction of resistor R17 and the collector of transistor Q17.

Figure 14A:
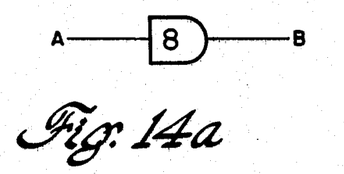
Figure 14B:
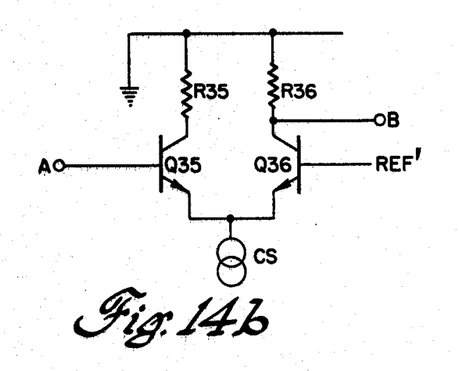

FIG. 14a illustrates the symbol for a voltage translator circuit. FIG. 14b illustrates the equivalent electrical circuit, wherein input A is applied to the base of transistor Q31, and output B is taken at the common terminal of resistor R32 and the collector of transistor Q32. The reference voltage REF' applied to the base of transistor Q32 differs from the normal reference voltage REF.

With these basic functional circuit elements in mind, defined by the logic symbols illustrated in FIGS. 5a-14a and the equivalent electrical schematics illustrated in FIGS. 5b-14b, we will now consider the overall architecture of the current mode 5-bit arithmetic logic unit with parity of the present invention as illustrated in FIGS. 2A-2C, 3A, 3B, and 4.

Figure 2A:
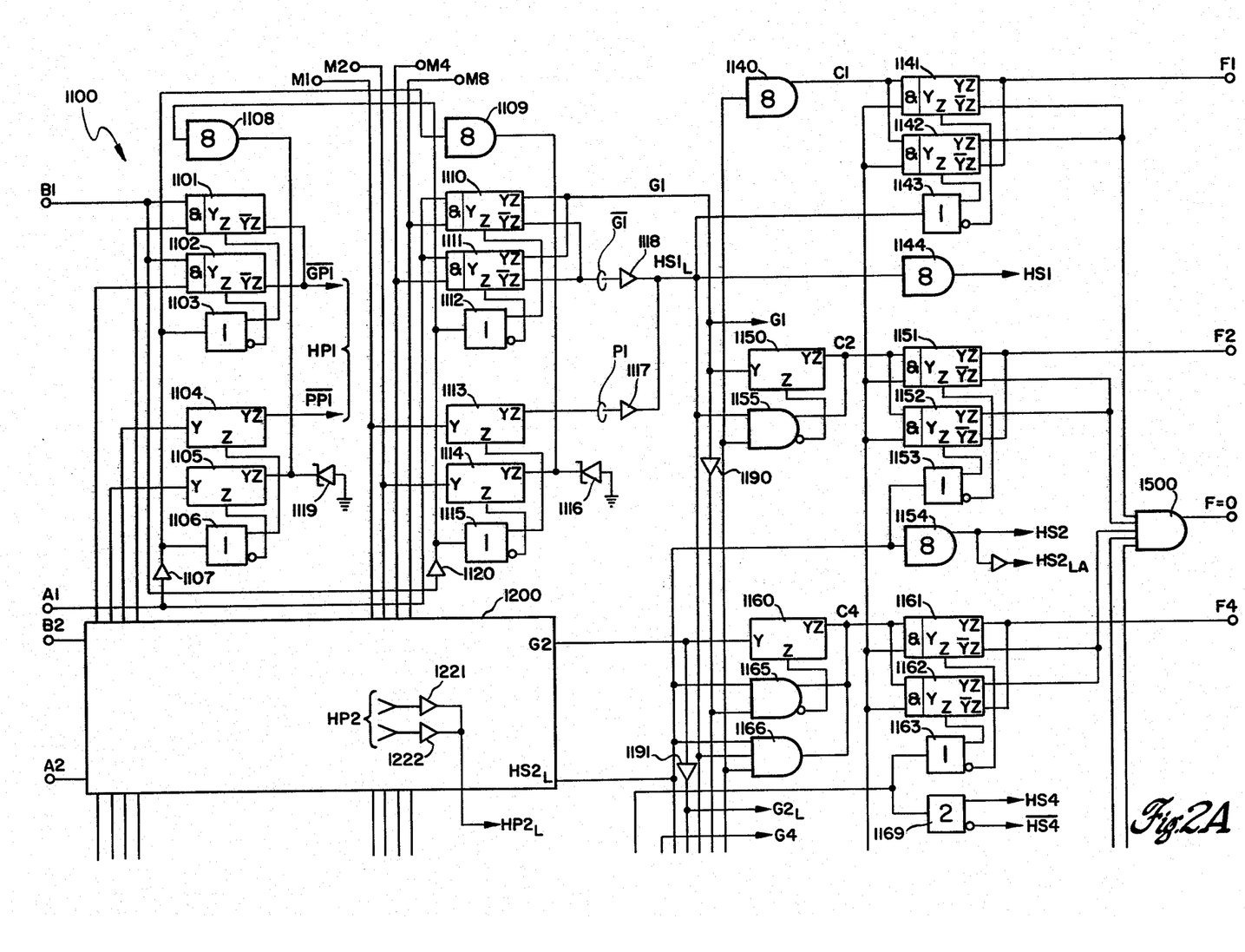
FIGS. 2A, 2B, and 2C show a combination block/circuit diagram illustrating a portion of a preferred embodiment of the current mode 5-bit arithmetic logic unit with parity of the present invention.
Figure 2B:
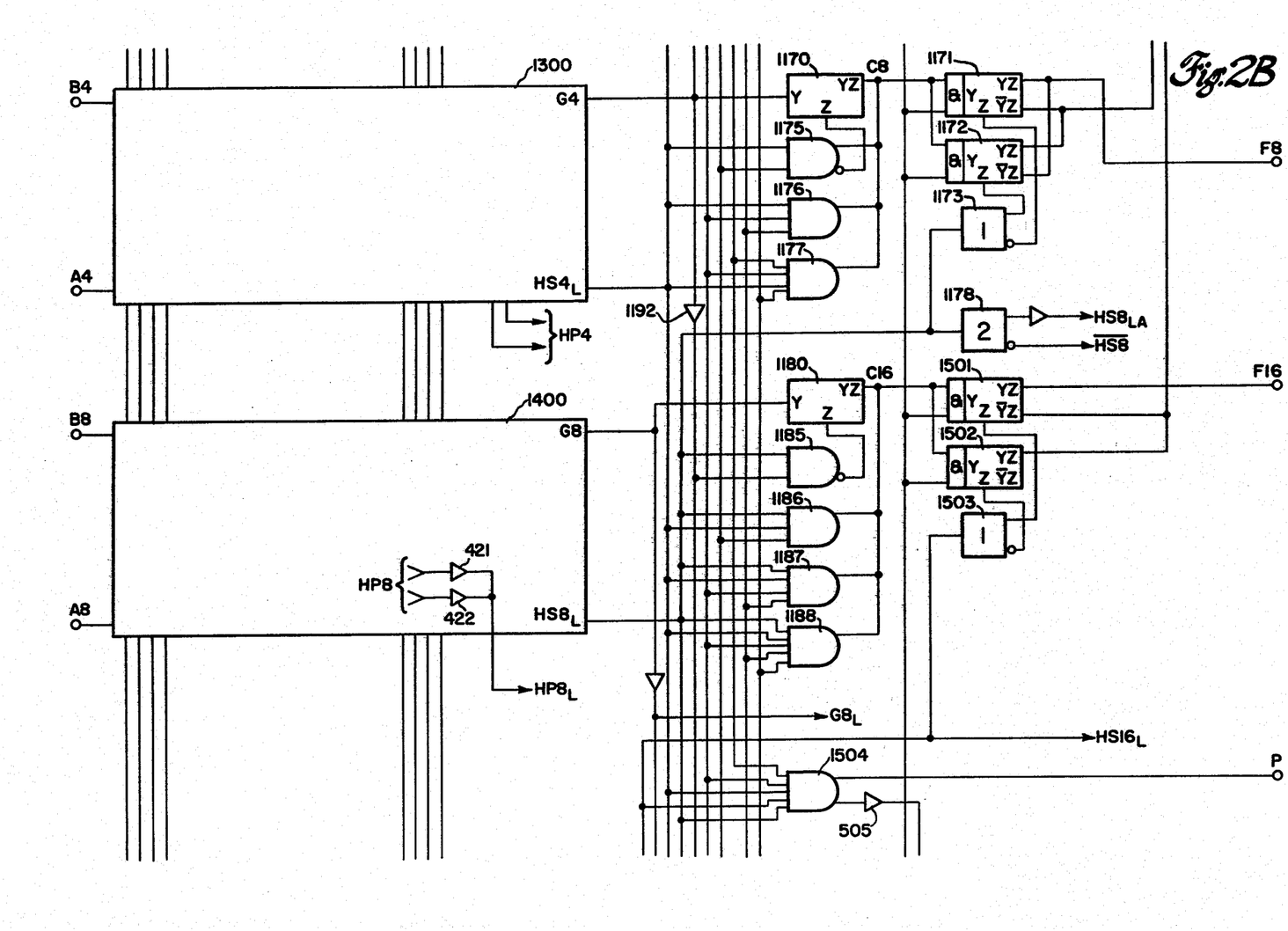
Figure 2C:
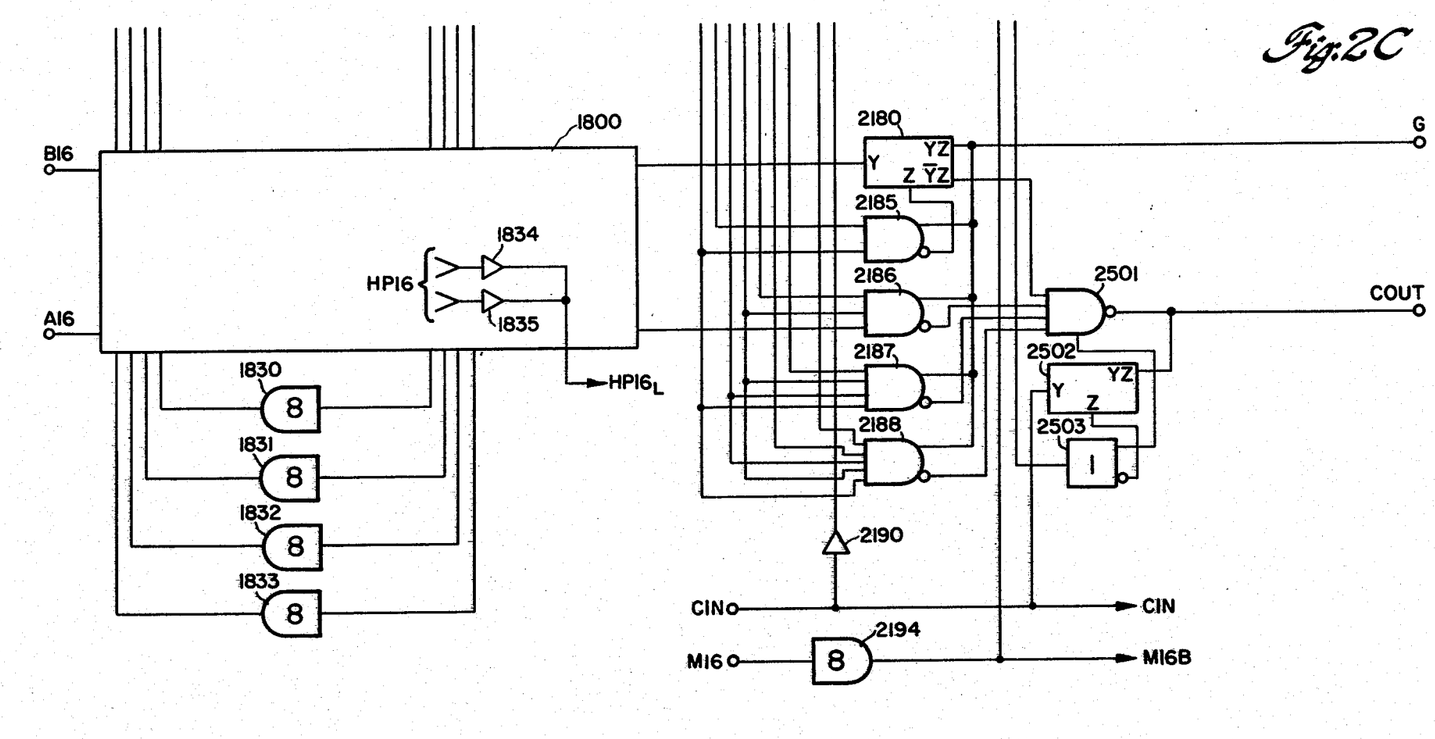

FIGS. 2A-2C show a combination block/circuit diagram illustrating that portion of a preferred embodiment of the present invention which generates the binary output resultant F1-F16, the F=0 output, the propogate output P, the generate output G, and the carry-out output COUT. The detailed circuitry illustrated in FIGS. 2A-2C also serves to generate a number of intermediate-level signals, which intermediate-level signals are used as inputs to the circuitry shown in FIGS. 3A and 3B.

Figure 3B:
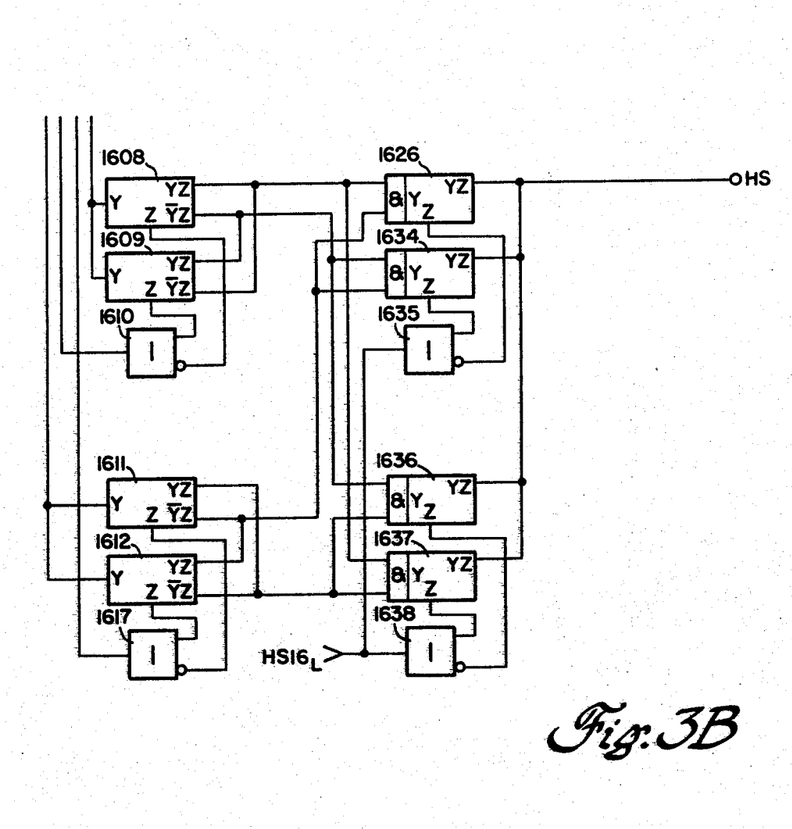

FIGS. 3A and 3B show a combination block/circuit diagram illustrating another portion of the preferred embodiment of the present invention, which circuitry serves to generate the parity of the carries output PC, the carry error output $\overline{CE}$, and the parity of the half-sums HS. The circuitry of FIGS. 3A and 3B also receives as inputs the carry-in signal CIN and the duplicate carry-in signal CIND.

Figure 4:
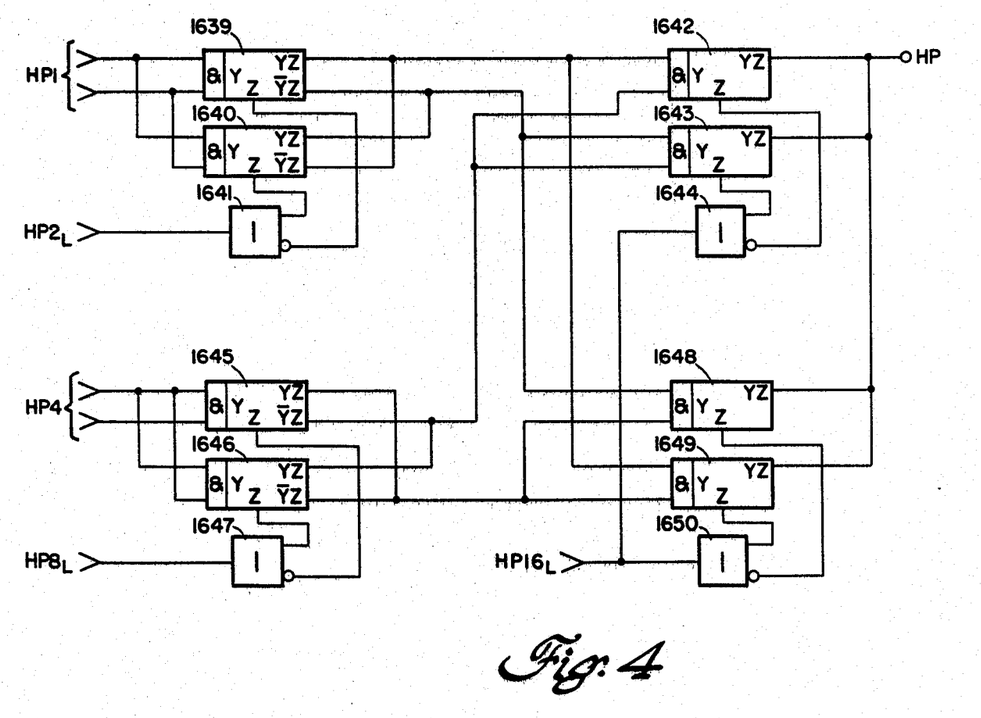
FIG. 4 shows a block diagram illustrating yet a further portion of a preferred embodiment of the current mode 5-bit arithmetic logic unit with parity of the present invention.

FIG. 4 shows a block diagram illustrating yet a further portion of the detailed circuitry of the present invention, which circuitry serves to generate the parity of the half-parities HP, in response to various intermediate-level signals generated by the circuitry shown in FIGS. 2A-2C.

With reference now specifically to FIGS. 2A and 2B, it will be seen that the A1 and B1 input bits are transmitted into that circuit portion shown generally by reference numeral 1100.

Correspondingly, bits A2 and B2 are transmitted into circuit-portion 1200. Bits A4 and B4 are transmitted into circuit portion 1300. Bits A8 and B8 are transmitted into circuit portion 1400. And bits A16 and B16 are transmitted into circuit portion 1800. Circuit portions 1100, 1200, 1300, 1400, and 1800 all receive as additional inputs mode control signals M1-M8 shown in the uppermost portion of FIG. 2A. The carry-in signal CIN and mode control signal M16 are received at the terminals shown in the lower-most portion of FIG. 2C.

The interconnected circuit elements shown in FIGS. 2A-2C operate on the two sets of binary inputs Ai and Bi to generate the various intermediate-level signals in the form of the half-sum signals HSi, half-parity signals HPi, carry propogate signals Pi, parity propogate signals PPi, carry generate signals Gi, and parity generate signals GPi in accordance with the following logic equations and state table:

Half Sum, Half Parity, Carry Propagate,
Parity Carry Generate, Parity and Generate
Intermediate Signals
(Hsi, HPi, Pi, PPi, Gi, GPi)

for $i = 1,2,3,8,16$
$Gi = M8 \cdot Ai \cdot Bi + M4 \cdot Ai \cdot \overline{Bi}$   $GPi = M8 \cdot Bi \cdot Ai + M1 \cdot Bi \cdot \overline{Ai}$
$Pi = Ai + M2 \cdot \overline{Bi}$   $PPi = Bi + M2 \cdot \overline{Ai} + M4 \cdot Ai$
$HSi = \overline{Gi} \cdot Pi$   $HPi = \overline{GPi} \cdot PPi$

| M8 | M4 | M2 | M1 | HSi | HPi |
|----|----|----|----|-----|-----|
| 0 | 0 | 0 | 0 | Ai | Bi |
| 0 | 0 | 0 | 1 | Ai + Bi | Ai · Bi |
| 0 | 0 | 1 | 0 | Ai + $\overline{Bi}$ | $\overline{Ai}$ + Bi |
| 0 | 0 | 1 | 1 | 1 | Ai ⊕ Bi |
| 0 | 1 | 0 | 0 | Ai · Bi | Ai + Bi |
| 0 | 1 | 0 | 1 | Bi | Ai |
| 0 | 1 | 1 | 0 | Ai ⊕ Bi | 1 |
| 0 | 1 | 1 | 1 | Ai + Bi | Ai + $\overline{Bi}$ |
| 1 | 0 | 0 | 0 | Ai · $\overline{Bi}$ | $\overline{Ai}$ · Bi |
| 1 | 0 | 0 | 1 | Ai ⊕ Bi | 0 |
| 1 | 0 | 1 | 0 | $\overline{Bi}$ | Ai |
| 1 | 0 | 1 | 1 | Ai + $\overline{Bi}$ | $\overline{Ai}$ · Bi |
| 1 | 1 | 0 | 0 | 0 | Ai ⊕ Bi |
| 1 | 1 | 0 | 1 | $\overline{Ai}$ · Bi | $\overline{Ai}$ · $\overline{Bi}$ |
| 1 | 1 | 1 | 0 | $\overline{Ai}$ · Bi | $\overline{Ai}$ + $\overline{Bi}$ |
| 1 | 1 | 1 | 1 | $\overline{Ai}$ | $\overline{Bi}$ |

⊕ denotes Exclusive Or.
⊕̄ denotes the inverse of Exclusive Or.

The carry intermediate signals Ci are generated in accordance with the following logic equations:

Carry Intermediate Signals (Ci)

$C1 =$ CIN
$C2 = G1 +$ HS1.CIN
$C4 = G2 + HS2.G1 +$ HS2.HS1.CIN
$C8 = G4 + HS4.G2 + HS4.HS2.G1 +$ HS4.HS2.HS1.CIN
$C16 = G8 + HS8.G4 + HS8.HS4.G2 + HS8.HS4.HS2.G1 +$ HS8.HS4.HS2.HS1.CIN

The function output signals Fi are generated in accordance with the following equations:

FUNCTION OUTPUT SIGNALS (FI)

for $i = 1,2,4,8,16$
$Fi = HSi + (Ci.M16)$

The special outputs in the form of the F=0, carry-out COUT, generate G, and propogate P signals are generated in accordance with the following logic equations:

SPECIAL OUTPUTS $(F = 0) = \overline{F16}.\overline{F8}.\overline{F4}.\overline{F2}.\overline{F1}$
$COUT = G16 + HS16.G8 + HS16.HS8.G4 + HS16.HS8.HS4.G2 + HS16.HS8.HS4.HS2.G1 + HS16.HS8.HS4.HS2.HS1.CIN$
$G = G16 + HS16.G8 + HS16.HS8.G4 + HS16.HS8.HS4.G2 + HS16.HS8.HS4.HS2.G1$
$P = HS16.HS8.HS4.HS2.HS1$ The resultant arithmetic and logic operations for the current mode 5-bit arithmetic logic unit with parity described above are given by following equations in the following table as a function of the 5-bit mode control signal M1-M16:

| M8 | M4 | M2 | M1 | M16 = 0 | ,16=1 |
|----|----|----|----|---------|-------|
| 0 | 0 | 0 | 0 | F = A | F=A plus CIN |
| 0 | 0 | 0 | 1 | F = A + B | F=A + B plus CIN |
| 0 | 0 | 1 | 0 | F = A + $\overline{B}$ | F=A + $\overline{B}$ plus CIN |
| 0 | 0 | 1 | 1 | F = logical 1 | F=minus 1 plus CIN |
| 0 | 1 | 0 | 0 | F = A · B | F=A plus (A · $\overline{B}$) plus CIN |
| 0 | 1 | 0 | 1 | F = B | F=(A+B)plus(A · $\overline{B}$)plus CIN |
| 0 | 1 | 1 | 0 | F = A ⊕ B | F=A minus B minus 1 plus CIN |
| 0 | 1 | 1 | 1 | F = A + B | F=(A · $\overline{B}$) minus 1 plus CIN |
| 1 | 0 | 0 | 0 | F = A · $\overline{B}$ | F=A plus (A · B) plus CIN |
| 1 | 0 | 0 | 1 | F = A ⊕ B | F=A plus B plus CIN |
| 1 | 0 | 1 | 0 | F= $\overline{B}$ | F=(A+$\overline{B}$)plus(A · B)plus CIN |
| 1 | 0 | 1 | 1 | F = $\overline{A}$ + B | F=(A · B) minus 1 plus CIN |
| 1 | 1 | 0 | 0 | F = logical 0 | F=A plus A plus CIN |
| 1 | 1 | 0 | 1 | F = $\overline{A}$ · B | F=(A+B) plus A plus CIN |
| 1 | 1 | 1 | 0 | F = $\overline{A}$ · $\overline{B}$ | F=(A+$\overline{B}$) plus A plus CIN |
| 1 | 1 | 1 | 1 | F = $\overline{A}$ | F=A minus 1 plus CIN |

With reference now in particular to FIGS. 3A and 3B, it will be seen that such circuitry receives as inputs the various intermediate-level signals generated by the circuitry shown and described above with regard to FIGS. 2A–2C. In addition, the circuitry in FIGS. 3A and 3B receives as inputs the carry-in signal CIN which is transmitted to emitter followers 615 and 1631, and the duplicate carry-in signal CIND which is transmitted to upper level gates 1628 and 1629.

The interconnected circuit elements shown in FIGS. 3A, 3B, and 4 operate on the designated intermediate-level inputs and the aforementioned primary inputs to generate the parity of the half-sums signal HS, the parity of the half-parities signal HP, the parity of the carries signal PC, and the carry error signal $\overline{CE}$ in accordance with the following logic equations:

PARITY AND ERROR OUTPUTS $HS = HS1 \oplus HS2 \oplus HS4 \oplus HS8 \oplus HS16$ $HP = HP1 \oplus HP2 \oplus HP4 \oplus HP8 \oplus HP16$
$PC = M16.\{[CIN(\overline{HS1} + HS2.\overline{HS4} + HS2.HS8)]$
$\oplus [G1.(\overline{HS2} + HS4.\overline{HS8})]$
$\oplus [G2.(\overline{HS4} + HS8)]$
$\oplus [G4.\overline{HS8}]$
$\oplus [G8]\}$
$\overline{CE} = [CIND + CIN] M16$ It should be noted that the current mode 5-bit arithmetic logic unit with parity of the present invention is incapable of forming parity prediction, parity checking, and carry checking operations independently. It is intended to be used in conjunction with the current mode 4-bit arithmetic logic unit with parity disclosed in Ser. No. 756,458 for such parity prediction, parity checking, and carry checking operations. The present invention has utility in generating various intermediate-level parity prediction, parity checking, and carry checking signals, which in the preferred embodiment assume the form of the parity of the half-sums signal HS, the parity of the half-parities signal HP, the parity of the carries signal PC, and the carry error signal $\overline{CE}$.

It will be apparent to those skilled in the art that the disclosed improved current mode 5-bit arithmetic logic unit with parity may be modified in numerous ways and may assume many embodiments other than that specifically set out and described above.

Accordingly, it is intended by the appended claims to cover all modifications of the invention which fall within the true spirit and scope of the invention.

What is claimed is:

1. A current mode 5-bit arithmetic logic unit for performing a repertoire of arithmetic and logic operations on two 5-bit bytes and for generating a plurality of intermediate-level output signals, said 5-bit arithmetic logic unit comprising:
  a first portion for receiving said first and second 5-bit bytes Ai and Bi, a carry-in signal CIN, and a mode control signal, said first portion generating a 5-bit binary output resultant signal Fi in response to said mode control signal, said first portion further generating a plurality of intermediate-level signals, a propogate signal P, a generate signal G, and a carry-out signal COUT; and
  a second portion responsive to said intermediate-level signals, and further responsive to said carry-in signal CIN and a carry-in duplicate signal CIND, said second portion generating output signals comprising a parity of the carries signal PC, a parity of the half-sum signal HS, a parity of the half-parities signal HP, and a carry error signal $\overline{CE}$.

2. The current mode 5-bit arithmetic logic unit recited in claim 1 wherein said mode control signal received by said first portion is a 5-bit binary signal M16 M8 M4 M2 M1, wherein said intermediate-level signals generated by said first portion comprise parity of the half-sum intermediate signals HSi, parity of the half-parities intermediate signals HPi, carry propagate intermediate signals Pi, parity propagate intermediate signals PPi, carry generate intermediate signals Gi, and parity generate intermediate signals GPi, where $i = 1, 2, 4, 8, 16$, and wherein said second portion generates said output signals in accordance with the following tables:

Parity and Error Outputs:

$HS = HS1 \oplus HS2 \oplus HS4 \oplus HS8 \oplus HS16$
$HP = HP1 \oplus HP2 \oplus HP4 \oplus HP8 \oplus HP16$
$PC = M16.\{[CIN(\overline{HS1} + HS2.\overline{HS4} + HS2.HS8)]$
  $\oplus [G1.(\overline{HS2} + HS4.HS8)]$
  $\oplus [G2.(\overline{HS4} + HS8)]$
  $\oplus [G4.\overline{HS8}]$
  $\oplus [G8]\}$
$\overline{CE} = [CIND + CIN] M16$ Half Sum, Half Parity, Carry Propagate, Parity Propagate, Carry Generate, and Parity Generate Intermediate Signals (HSi, HPi, Pi, PPi, Gi, GPi):

$Gi = M8 \cdot Ai \cdot Bi + M4 \cdot Ai \cdot \overline{Bi}$      $GPi = M8 \cdot Bi \cdot Ai + M1 \cdot Bi \cdot \overline{Ai}$
$Pi = Ai + M2 \cdot \overline{Bi}$                                    $PPi = Bi + M2 \cdot \overline{Ai} + M4 \cdot Ai$
$HSi = \overline{Gi} \cdot Pi$                                         $HPi = \overline{GPi} \cdot PPi$

| M8 | M4 | M2 | M1 | HSi | HPi |
|----|----|----|----|-----|-----|
| 0 | 0 | 0 | 0 | Ai | Bi |
| 0 | 0 | 0 | 1 | Ai + Bi | Ai · Bi |
| 0 | 0 | 1 | 0 | Ai + $\overline{Bi}$ | Ai + Bi |
| 0 | 0 | 1 | 1 | 1 | Ai $\oplus$ Bi |
| 0 | 1 | 0 | 0 | Ai · Bi | Ai + Bi |
| 0 | 1 | 0 | 1 | Bi | Ai |
| 0 | 1 | 1 | 0 | Ai $\oplus$ Bi | 1 |
| 0 | 1 | 1 | 1 | Ai + Bi | Ai + $\overline{Bi}$ |
| 1 | 0 | 0 | 0 | Ai · $\overline{Bi}$ | $\overline{Ai}$ · Bi |
| 1 | 0 | 0 | 1 | Ai $\oplus$ Bi | 0 |
| 1 | 0 | 1 | 0 | $\overline{Bi}$ | $\overline{Ai}$ |
| 1 | 0 | 1 | 1 | Ai + $\overline{Bi}$ | $\overline{Ai}$ · $\overline{Bi}$ |
| 1 | 1 | 0 | 0 | 0 | Ai $\oplus$ Bi |
| 1 | 1 | 0 | 1 | $\overline{Ai}$ · Bi | Ai · $\overline{Bi}$ |
| 1 | 1 | 1 | 0 | $\overline{Ai}$ · $\overline{Bi}$ | $\overline{Ai}$ + $\overline{Bi}$ |
| 1 | 1 | 1 | 1 | $\overline{Ai}$ | $\overline{Bi}$ |

* * * * *